Feb. 22, 1966  AKIRA OKAYA  3,237,132
DIELECTRIC MICROWAVE RESONATOR
Filed Jan. 21, 1960  2 Sheets-Sheet 1
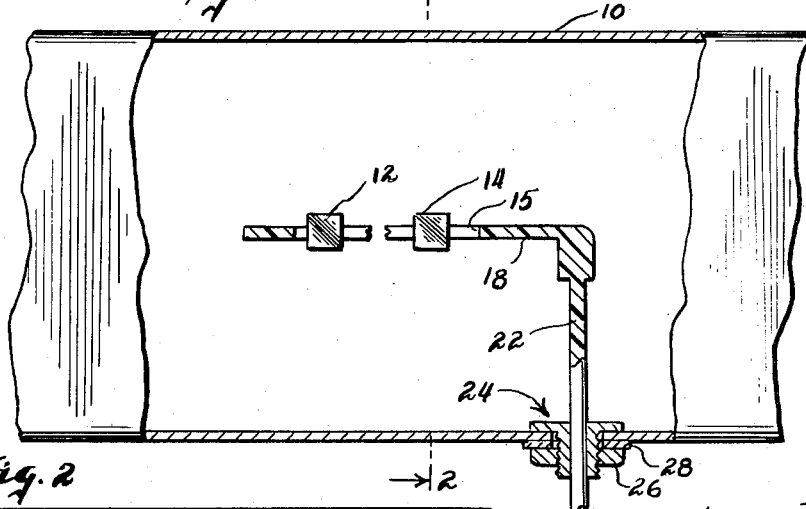
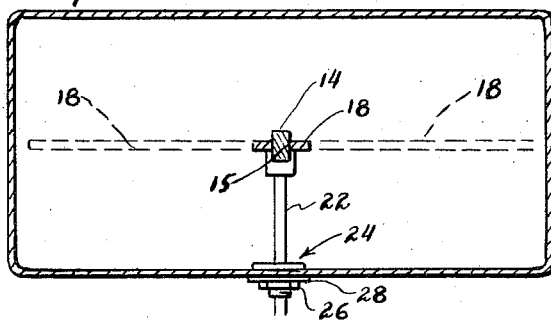
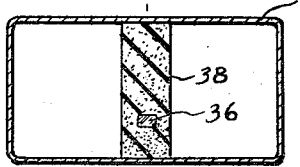
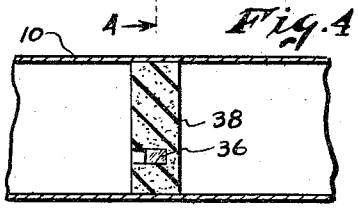
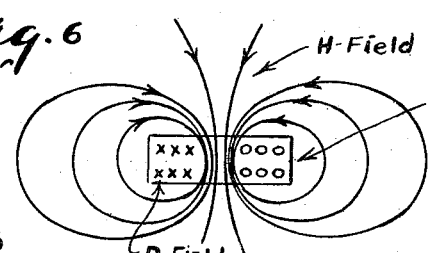
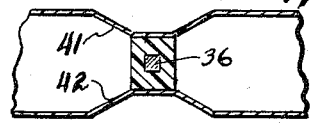
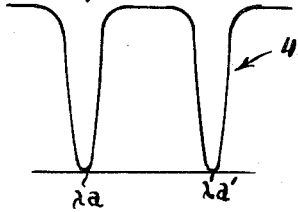
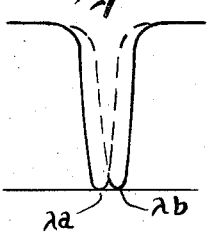
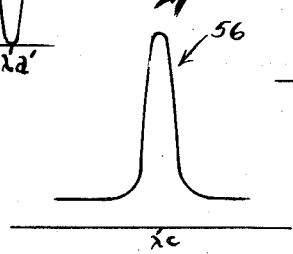
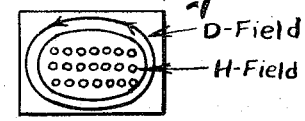
INVENTOR.
Akira Okaya
BY Emery, Whittemore
Sandoe & Graham
ATTORNEYS United States Patent Office 3,237,132
Patented Feb. 22, 1966

3,237,132
DIELECTRIC MICROWAVE RESONATOR
Akira Okaya, 247 Fort Lee Road, Leonia, N.J.
Filed Jan. 21, 1960, Ser. No. 3,872
10 Claims. (Cl. 333—73)

This invention relates to control of microwave radiation by resonators.

It is an object of the invention to provide a small resonator which does not disturb the microwave field inside of a wave guide except at the resonator frequency of the resonator. With the resonator of this invention, the standing wave ratio outside of the resonator frequency is very small as compared to conventional metal wall cavity resonators.

Another object is to provide a resonator which can be adjusted between one position in which it reflects back microwave energy which has a frequency different from the frequency of the resonator and another position in which it reflects back microwave energy having the same frequency as that of the resonator.

Another object of the invention is to provide a resonator which is suitable as an accurate frequency standard, when maintained at a constant low temperature such as that of liquid nitrogen or liquid helium.

Another object is to support one or more resonators in the path of electromagnetic waves and with provision for moving the resonators so as to change their orientation and/or their position transversely of the path of the waves.

Another object is to provide a resonator of much smaller size than the metal wall cavity resonators that have been used, and to obtain a filter made out of a dielectric resonator which is extremely compact with resulting saving in space.

The resonator of this invention has an extremely high Q as compared with metal wall cavity resonators and this advantage is found especially in the millimeter wave region.

The resonators of this invention must be of material having a limited power factor and high dielectric constant. A crystal material, like rutile, which has a paramagnetic salt impurity is an excellent resonator for a solid state maser amplifier or oscillator, of high efficiency, resulting from the high Q value of the rutile resonator.

Another object of the invention is to provide apparatus for more accurately measuring the dielectric constant and power loss factor in the microwave regions.

The resonator of this invention may be used as a component of a microwave generator or receiver, as well as for a filter or maser. For purposes of this invention the term "microwave" is used to designate waves within the wave length range from thirty centimeters to 0.5 millimeter.

Other objects, features and advantages of the invention will appear or be pointed out as the description proceeds.

In the drawing, forming a part hereof, in which like reference characters indicate corresponding parts in all the views:

FIGURE 1 is a side elevation, partly broken away and in section, showing a wave guide with resonators located therein and supported for adjustment in the wave guide;

FIGURE 2 is a sectional view taken on the line 2—2 of FIGURE 1;

FIGURE 3 is a sectional view to a wave guide with a different kind of means for holding a crystal;

FIGURE 4 is a sectional view taken on the line 4—4 of FIGURE 3;

FIGURE 5 is a view similar to FIGURE 4 but showing a modified form of the invention;

FIGURE 6 is a diagram showing one mode of square-shaped resonators such as may be used for this invention;

FIGURE 7 is a diagrammatic view showing the mode inside the resonator of FIGURE 6;

FIGURES 8, 9 and 10 are diagrams showing the way in which energy of certain predetermined wave lengths is suppressed in accordance with different operating conditions of this invention.

Figure 11:
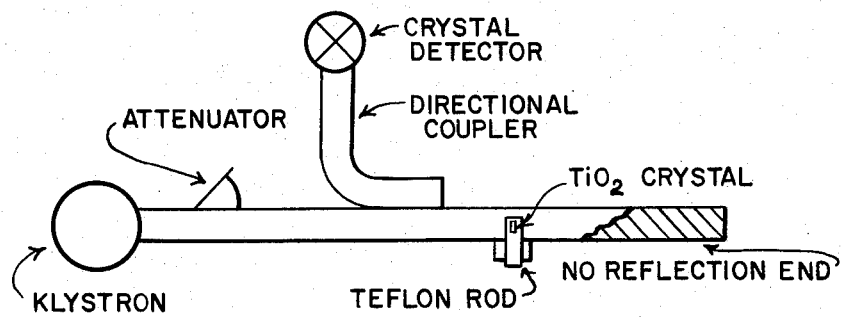
FIGURES 11 and 12 are diagrammatic views showing experimental set-ups for measuring the resonant frequency and characteristics of resonators of this invention.

FIGURE 1 shows a wave guide 10 in which there are two resonators 12 and 14. Each of these resonators is a piece of material having a power factor less than 0.005 and a dielectric constant larger than 5, and preferably a Q value larger than 100. It will be evident that the resonator cannot be made of metal. It must be a solid, but there are numerous solids having the required high dielectric constant and small dielectric loss.

The relation of power factor to dielectric constant is expressed in the equation:

$\tan \delta = $ (power factor) = conductivity/dielectric constant
$\times$ angular frequency of the microwave The angular frequency $= 2\pi f$ and $$f = c/\lambda$$

Where: $c$ = velocity of light
$\lambda$ = wave length of microwave

Various crystals can be used, such as rutile; ruby; and sapphire. A resonator made of such material has both a crystal axis and a resonator axis. It is the latter axis which is important in determining the performance of the resonator. Its effectiveness in absorbing or rejecting radiant energy of certain wave lengths is changed by varying the direction of the resonator axis with respect to the wave guide axis. The greatest absorption occurs when the resonator axis is in a particular orientation to the longitudinal axis of the wave guide, but this orientation is different at different locations transverse of the wave guide.

The resonators are described herein as "absorbing or rejecting radiant energy of certain wave lengths," depending upon whether the resonator reflects energy of the resonant frequency or reflects all energy except that of the resonant frequency.

Not only crystals are suitable for this invention. Other materials also can be used. The resonator can be made of glass, ceramics and other substances, whether crystalline or not, when they have the dielectric constant and power factor characteristics described above.

The resonant frequency of the resonator depends not only upon the material of which it is constructed, but also upon its shape, size, temperature and pressure. The resonance of such a solid resonator is referred to herein as "shape" or "dielectric" resonance. For purposes of this invention the resonators are generally used at room temperature and atmospheric pressure. When extremely accurate results are desired, or variations are to be avoided, the resonator must be kept at constant temperature. Variations in barometric pressure with changes in weather conditions are not sufficient to cause significant changes in the resonator performance.

Each of the resonators 12 and 14 fits into a slot 15 in an arm 18. The sides of the slot 15 have enough resilience to hold the resonators in any set position by friction and the resonators are movable along the arm 18.

One end of the arm 18 is attached to the upper end of a supporting rod 22 which extends through a bearing 24 in the bottom side of the wave guide. The arm 20 and rod 22 are preferably made of "Teflon" and the rod is axially as well as rotationally movable in the bearing 24. This bearing has a flange against the inner face of the wave guide and it has external threads for receiving a clamping nut 26. A washer 28 is shown between the nut 26 and the outside surface of the wave guide.

The rod 22 can be rotated in the bearing 24 to swing the arm 18 into any position around the vertical axis of the rod. Two different positions for the arm 18 are shown in dotted lines in FIGURE 2. The bearing 24 preferably has a tapered outside thread, and may be split if desired so that tightening of the nut 26 increases the friction of the rod 22 in the bearing 24 to hold the rod in any set position.

From the description thus far it will be apparent that the resonators 12 and 14 can be moved into different positions by rotating them in the slot 15 without moving the arm 18, and they can be moved into different positions transverse of the wave guide by turning the rod 22. The resonators can be raised and lowered in the wave guide by moving the rod 22 axially in the bearing 24.

The supporting and adjusting means for the resonators 12 and 14 are representative of adjustable supporting means for giving the resonators universal adjustment in the wave guide for both orientation and position transversely of the wave guide.

FIGURE 3 is a sectional view, on a reduced scale, similar to FIGURE 2 but showing a resonator 36 attached to a block 38 of solid foamed material, such as "polyfoam," which fits into the wave guide 10 and which may be shifted transversely of the wave guide to move the resonator 36 into different positions. The resonator 36 may be secured to the block 38 by adhesive or other means, but preferably attached to the block by inserting the resonator 36 into a socket in the block. A socket can be formed at any place in the polyfoam by merely pushing the resonator 36 into the surface of the polyfoam which is soft enough to yield under the pressure and form a socket having the shape of the resonator 36 for any particular orientation of the resonator.

FIGURE 4 is a sectional view taken on the line 4—4 of FIGURE 3 and showing the extent of the block 38 lengthwise of the wave guide for providing the block with stability.

FIGURE 5 is a view similar to FIGURE 4 but showing a modified form of the invention in which the sides of the wave guide converge to a throat and then diverge to the full cross section of the wave guide. In this construction the energy is concentrated at the throat formed by the inwardly extending side walls 41 and 42, and the crystal 36 is located in this throat. With this construction the crystal is operating in a field in which the energy is of higher density.

FIGURE 6 is a diagram showing the theory of this invention. The modes of square-shaped resonators are similar to the members of the $TM_{onm}$ mode and the lowest mode is shown in FIGURE 6.

The mode inside this resonator is unique and has a configuration which corresponds to interchanged E and H (magnetic) fields of a $TE_{onm}$ metal walled cavity mode. Electric field energy is stored mainly inside the resonator in the form of a dense displacement electric field. There is a relatively small displacement electric field outside of the crystal resonator, because of the high microwave reflection coefficient at the wall of the dielectric resonator. The resonator is transparent for the magnetic field, and looks like a magnetic dipole from the outside. Therefore the coupling of the wave guide to the crystal resonator is mostly magnetic coupling. The coupling to the resonator is easily adjusted by adjusting the angle between the H field outside the crystal, which is caused by the presence of the crystal resonator, and the H field of the input microwave power. Therefore the loaded Q value ($Q_L$) of this resonator is determined by $Q_{ext}$, and the unloaded Q, $Q_u(=Q_{diel})$ which is due to the dielectric loss in the resonator.

Then $$1/Q_L = 1/Q_{ext} + 1/Q_{dielectric}$$

and also, $$Q_{diel} = \epsilon w/\delta = \tan^{-1}\delta$$

Figure 12:
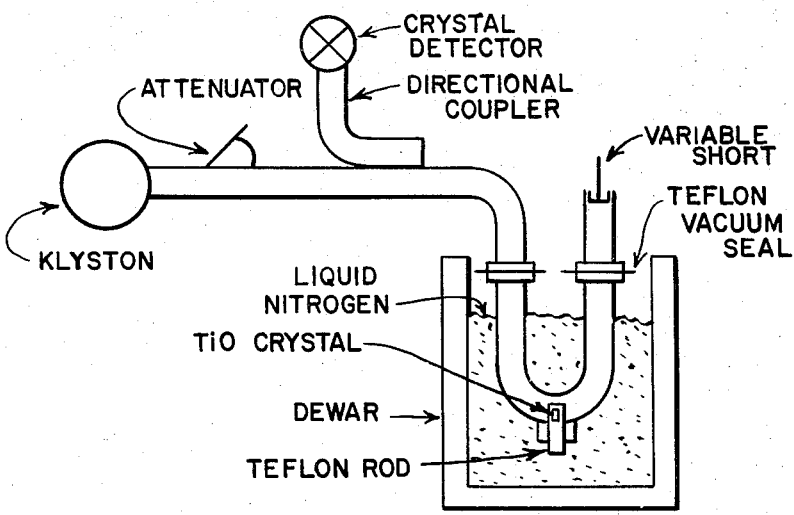

Experimental set-ups are shown in FIGURES 11 and 12. The reversed directional coupler samples the power reflected from the resonator. If its directivity is reasonably high and the input power constant, the crystal detector will measure the reflected power from the resonator as a function of frequency fairly accurately.

If there are losses in the wave guide system, they will always lower the apparent Q of the resonator. The resonator coupling is adjusted at room temperature to produce critical coupling in appearance, i.e., no reflected power of resonance.

Then $$Q_u \cong 2Q_L \text{ with critical coupling}$$

At liquid nitrogen temperatures the unloaded Q of the resonator increases considerably and since the crystal cannot be rotated to produce critical coupling, the matched load of FIGURE 11 is replaced by a movable short as shown in FIGURE 12. This will add a susceptance to the crystal admittance and this effect is to critically couple the resonator at some frequency slightly off resonance. If the losses in this section of shorted wave guide are small, the $Q_u$ will not be affected. When the resonator $Q_u$ becomes extremely high, these losses may become important and the actual value of $Q_u$ becomes higher than that measured by this technique. In any case, the method has been adopted for its simplicity and convenience.

The values compared have been obtained by the procedure described above. The resonant frequency of the lowest mode, was measured and $\epsilon$ apparent was obtained from the following relation:

$$\sqrt{\epsilon_{ap}} = 2/\lambda_{011}((1/a)^2 + (1/b)^2)^{\frac{1}{2}}$$

$\lambda_{011}$ = wavelength of the lowest resonator resonant mode.
$a, b$ = length and width of the dielectric resonator.

FIGURE 8 shows a graph 40 representing the radiant energy of microwaves moving along a wave guide. Substantially all of the energy of the wave length $\lambda_a$ is absorbed by one of the resonators and substantially all of the energy of the wave lengths $\lambda_{a'}$ is absorbed by another resonator.

In FIGURE 9 radiation is absorbed by two resonators having resonant frequencies corresponding to the wave lengths $\lambda_a$ and $\lambda_b$. These wave lengths are so close together that the band of energy absorbed by each resonator overlaps that absorbed by the other resonator and thus a substantially wider band of wave lengths is prevented from traveling through the wave guide. By using any necessary number of resonators which affect overlying bands of wave lengths, as in FIGURE 9, the resonators can be used to filter out as many frequencies as desired, thus providing an effective filter.

FIGURE 10 shows another condition in which the position of the resonator with respect to the mode is such that it disturbs the mode extremely at all frequencies except the resonant frequency. The graph 56 in FIGURE 10 shows the resonator producing substantially the opposite effect to that produced by either one of the resonators shown in FIGURES 8 and 9. Thus different effect is obtained by changing the position of the resonator with respect to the mode of the energy passing through the wave guide.

One embodiment of the invention has been illustrated and described but modifications can be made and features of the invention can be used in different combinations in components of the apparatus set forth in the introduction of this specification without departing from the invention as defined in the claims.

What is claimed is:

1. Microwave apparatus for operation at a predetermined frequency including a wave guide to which microwaves are supplied, a dielectric resonator located in the wave guide intermediate the ends of the wave guide, the cross section of the wave guide being substantially unobstructed upstream of the resonator, said dielectric resonator being a solid piece of material having a particular natural frequency of dielectric resonance the effective coupling of the solid piece being dependent upon the orientation of the resonator with respect to the microwaves, but which is not dependent on piezoelectric characteristics and which is also independent of the size and shape of the wave guide and resonating at that frequency to reflect or absorb, depending upon the modes of the microwaves and frequency of the dielectric resonator, the microwave frequency corresponding to said resonator frequency, the material of the resonator having a power factor less than 0.005 and a dielectric constant greater than 5, and the mode inside the resonator being unique by having a configuration which corresponds selectively to the TE or TM mode.

2. The combination described in claim 1, and in which the resonator has a Q value greater than 100, where Q is the ratio of the stored energy inside the resonator to the dissipated energy of the resonator per cycle.

3. The combination described in claim 1 and in which the resonator is a rutile crystal.

4. The combination described in claim 1 and in which there is a support extending part way across the transverse cross section of the wave guide, and the resonator is carried on the support, and the support is rotatable to change the orientation of the resonator in the wave guide.

5. The combination described in claim 1 and in which there is a support extending part way across the transverse cross section of the wave guide, and the resonator is carried on the support, and a bearing in which the support is movable in directions to change the position of the resonator transversely of the wave guide.

6. A filter for eliminating a predetermined wave length of radiation from microwaves including a wave guide to which microwaves are supplied, a dielectric resonator located in the wave guide intermediate the ends of the wave guide, the cross section of the wave guide being substantially unobstructed upstream of the resonator so as to eliminate cavity resonance, said dielectric resonator being a solid piece of material having a particular natural frequency of dielectric resonance which is not dependent on piezoelectric characteristics and which is also independent of the size and shape of the wave guide and resonating at that frequency to reflect or absorb, depending upon the mode of the wave energy, the microwaves corresponding to the wave length that is to be filtered out, the material of the resonator having a power factor less than 0.005 and a dielectric constant greater than 5, and the mode inside the resonator being unique by having a configuration which corresponds selectively to the TE or TM mode.

7. The apparatus described in claim 6 and in which there are supporting means for the resonator and the supporting means are adjustable to give the resonator any selected orientation in the wave guide and to position the resonator in any selected location transversely of the wave guide.

8. A filter for eliminating a predetermined wave length of radiation from microwaves including a wave guide to which microwaves are supplied, a dielectric resonator located in the wave guide intermediate the ends of the wave guide and at a location where the wave guide is substantially unobstructed, the dielectric resonator being spaced from all sides of the wave guide, said dielectric resonator being a solid piece of material having the quality of dielectric resonance at a particular natural frequency of the piece, said frequency corresponding to the wave length that is to be filtered out of the microwaves, the material of the resonator having a power factor less than 0.005 and a dielectric constant greater than 5, the mode inside the resonator being unique by having a configuration which corresponds selectively to the same or to interchanged E and H fields of a $TE_{onm}$ metal wall cavity mode, and in which there are at least two dielectric resonators in the wave guide, and the resonators are of different dielectric resonant frequency.

9. The apparatus described in claim 8 and in which the resonant frequencies of the plural resonators are close together so that the resonators eliminate frequencies over bands that merge with one another.

10. The combination with a wave guide of a dielectric resonator having dielectric resonance at a frequency $f$ of the lowest mode and comprising a block of material having a power factor less than 0.005 and a dielectric constant greater than 5, the block being of much smaller cross section than that of the wave guide and of a length "$a$" and width "$b$" correlated with $\epsilon$ apparent as follows:

$$\sqrt{\epsilon_{ap}} = 2/\lambda_{011}((1/a)^2 + (1/b)^2)^{\frac{1}{2}}$$

where $\lambda_{011}$ = wave length of the lowest resonator resonant mode.

References Cited by the Examiner

UNITED STATES PATENTS

| | | | |
|---|---|---|---|
| 2,808,573 | 10/1957 | De Bell | 333—11 |
| 2,883,481 | 4/1959 | Tien | 330—4 |
| 2,909,654 | 10/1959 | Bloemgren | 333—83 |
| 2,924,792 | 2/1960 | Gyorgy | 333—83 |
| 2,993,176 | 7/1961 | Bolef | 330—4 |
| 3,054,065 | 9/1962 | Woodruff | 330—4 |
| 3,064,201 | 11/1962 | Damon | 330—4 |

FOREIGN PATENTS 157,564   7/1954   Australia.

OTHER REFERENCES

Geusic: "Paramagnetic Fine Structure Spectrum of Cr in a Single Tube Crystal," Physical Review, vol. 192, No. 5, June 1, 1956 (pages 1252–1253).

Strandberg et al.: Proc. IRE January 1959, pages 80–81.

Wessel: "A UHF Ruby Maser." Proceedings of the IRE, April 1959, page 590.

HERMAN KARL SAALBACH, *Primary Examiner.*

ELI J. SAX, *Examiner.*

REEXAMINATION CERTIFICATE (145th)
United States Patent [19]
Okaya

[11] B1 3,237,132

[45] Certificate Issued  Dec. 6, 1983

[54] DIELECTRIC MICROWAVE RESONATOR

[75] Inventor: Akira Okaya, Leonia, N.J.

[73] Assignee: Patlex Corp., Westfield, N.J.

Reexamination Request:
No. 90/000,330, Feb. 18, 1983

Reexamination Certificate for:
Patent No.: 3,237,132
Issued: Feb. 22, 1966
Appl. No.: 3,872
Filed: Jan. 21, 1960

[51] Int. Cl.$^3$ ............... H01P 1/207; H01P 7/10
[52] U.S. Cl. ............... 333/211; 333/208; 333/209; 333/219; 333/235
[58] Field of Search ............... 333/219, 235, 202, 208, 333/209, 227, 231, 232

[56] References Cited
U.S. PATENT DOCUMENTS

| | | | |
|---|---|---|---|
| 2,838,736 | 6/1958 | Foster | 333/227 |
| 2,890,422 | 6/1959 | Schlicke | 333/202 X |
| 2,924,792 | 2/1960 | Gyorgy | 333/83 |

OTHER PUBLICATIONS

"Dielectric Resonators", R. D. Richtmyer, Journal of Applied Physics, vol. 10, Jun. 1939, pp. 391-398.
"Quasi-Degenerated Modes in High Dielectric Cavities", H. M. Schlicke, Journal of App. Physics, vol. 24, No. 2, Feb. 1953, pp. 187-191.

*Primary Examiner*—Paul L. Gensler

EXEMPLARY CLAIM

1. Microwave apparatus for operation at a predetermined frequency including a wave guide to which microwaves are supplied, a dielectric resonator located in the wave guide intermediate the ends of the wave guide, the cross section of the wave guide being substantially unobstructed upstream of the resonator, said dielectric resonator being a solid piece of material having a particular natural frequency of dielectric resonance the effective coupling of the solid piece being dependent upon the orientation of the resonator with respect to the microwaves, but which is not dependent on piezoelectric characteristics and which is also independent of the size and shape of the wave guide and resonating at that frequency to reflect or absorb, depending upon the modes of the microwaves and frequency of the dielectric resonator, the microwave frequency corresponding to said resonator frequency, the material of the resonator having a power factor less than 0.005 and a dielectric constant greater than 5, and the mode inside the resonator being unique by having a configuration which corresponds selectively to the TE or TM mode.

REEXAMINATION CERTIFICATE ISSUED UNDER 35 U.S.C. 307.

DIELECTRIC MICROWAVE RESONATOR

NO AMENDMENTS HAVE BEEN MADE TO THE PATENT

AS A RESULT OF REEXAMINATION, IT HAS BEEN DETERMINED THAT:

The patentability of claims 1-10 is confirmed.

* * * * *